United States Patent [19]

Miyata

[11] Patent Number: 5,676,225

[45] Date of Patent: Oct. 14, 1997

[54] BELT TRANSMISSION DEVICE FOR ENGINE AUXILIARIES

[75] Inventor: Hirofumi Miyata, Kobe, Japan

[73] Assignee: Bando Chemical Industries, Ltd., Kobe, Japan

[21] Appl. No.: 613,199

[22] Filed: Mar. 6, 1996

[30] Foreign Application Priority Data

Mar. 8, 1995 [JP] Japan ................... 7-048082

[51] Int. Cl.$^6$ ................... F16H 9/00; F16H 11/00; F16D 41/00
[52] U.S. Cl. ................... 192/41 R; 192/45; 192/45.1; 474/70; 474/74
[58] Field of Search ................... 192/41 R, 45, 192/45.1; 474/70, 71, 72, 73, 74, 79

[56] References Cited

U.S. PATENT DOCUMENTS

| | | | |
|---|---|---|---|
| 4,392,840 | 7/1983 | Radocaj | 192/45 X |
| 4,457,269 | 7/1984 | Beardmore | 192/41 R X |
| 4,613,318 | 9/1986 | McWilliam et al. | 474/74 |
| 4,725,259 | 2/1988 | Miyata | 474/70 |

FOREIGN PATENT DOCUMENTS 61-228153  10/1986  Japan.

*Primary Examiner*—Andrea L. Pitts
*Attorney, Agent, or Firm*—Sixbey, Friedman, Leedom & Ferguson, P.C.; Gerald J. Ferguson, Jr.

[57] ABSTRACT

In a belt transmission device in which rotating inertia torque of a rotor of an alternator is avoided, by a one-way clutch, from being inversely transmitted to a crank shaft of an engine, the one-way clutch is composed so as to effectively respond to slight variation in angular velocity of the crank shaft to prevent a mis-locking, thereby preventing a slip of a transmission belt and extending a belt life. To attain this purpose, an angle of operational delay of the outer roller type one-way clutch until the one-way clutch is switched from the freed state to the locked state between a driving-side outer race and a driven-side inner race is set to be smaller than a specified angle of displacement of slight variation in angular velocity to be transmitted to the outer race in a high-rpm region of the engine.

4 Claims, 14 Drawing Sheets

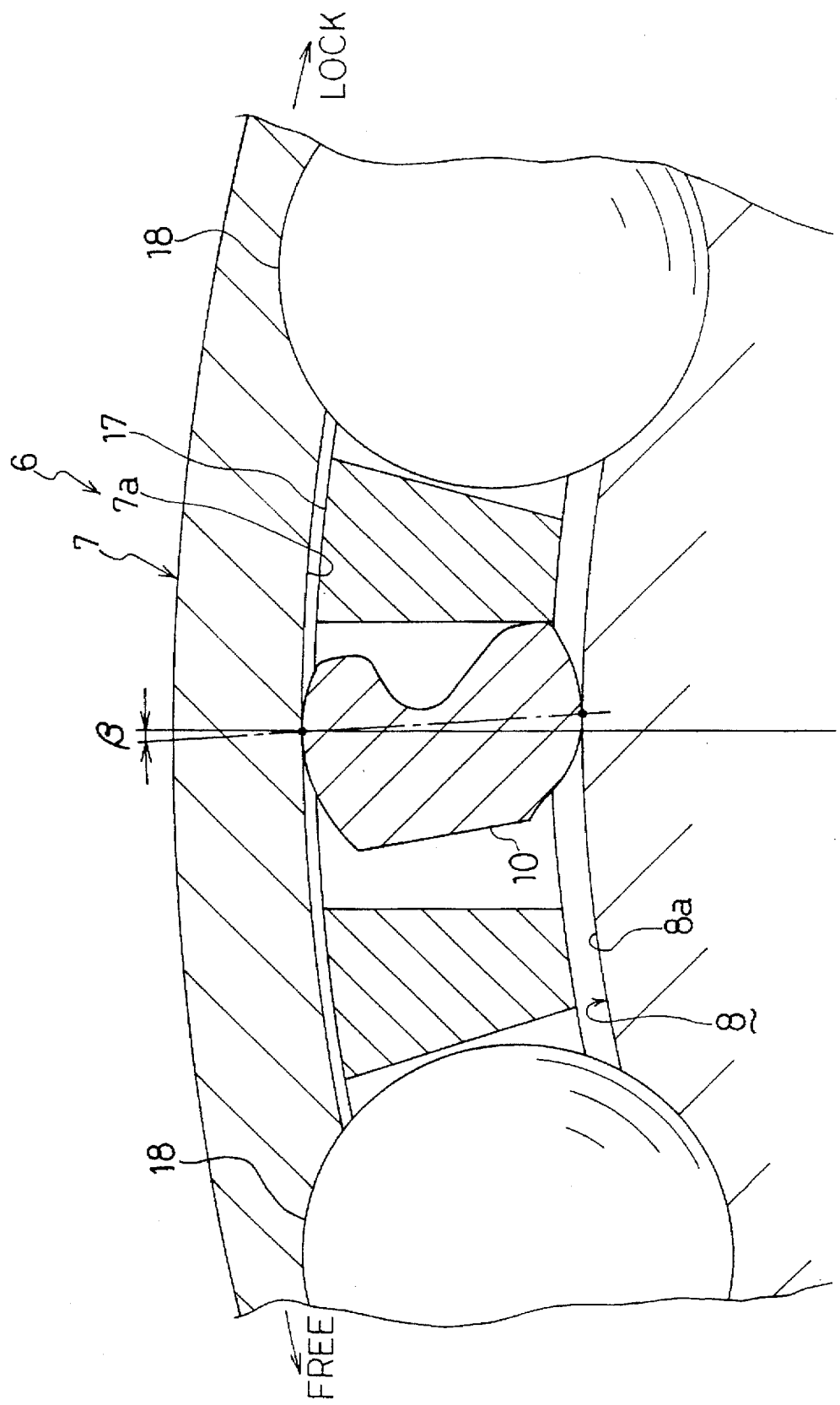

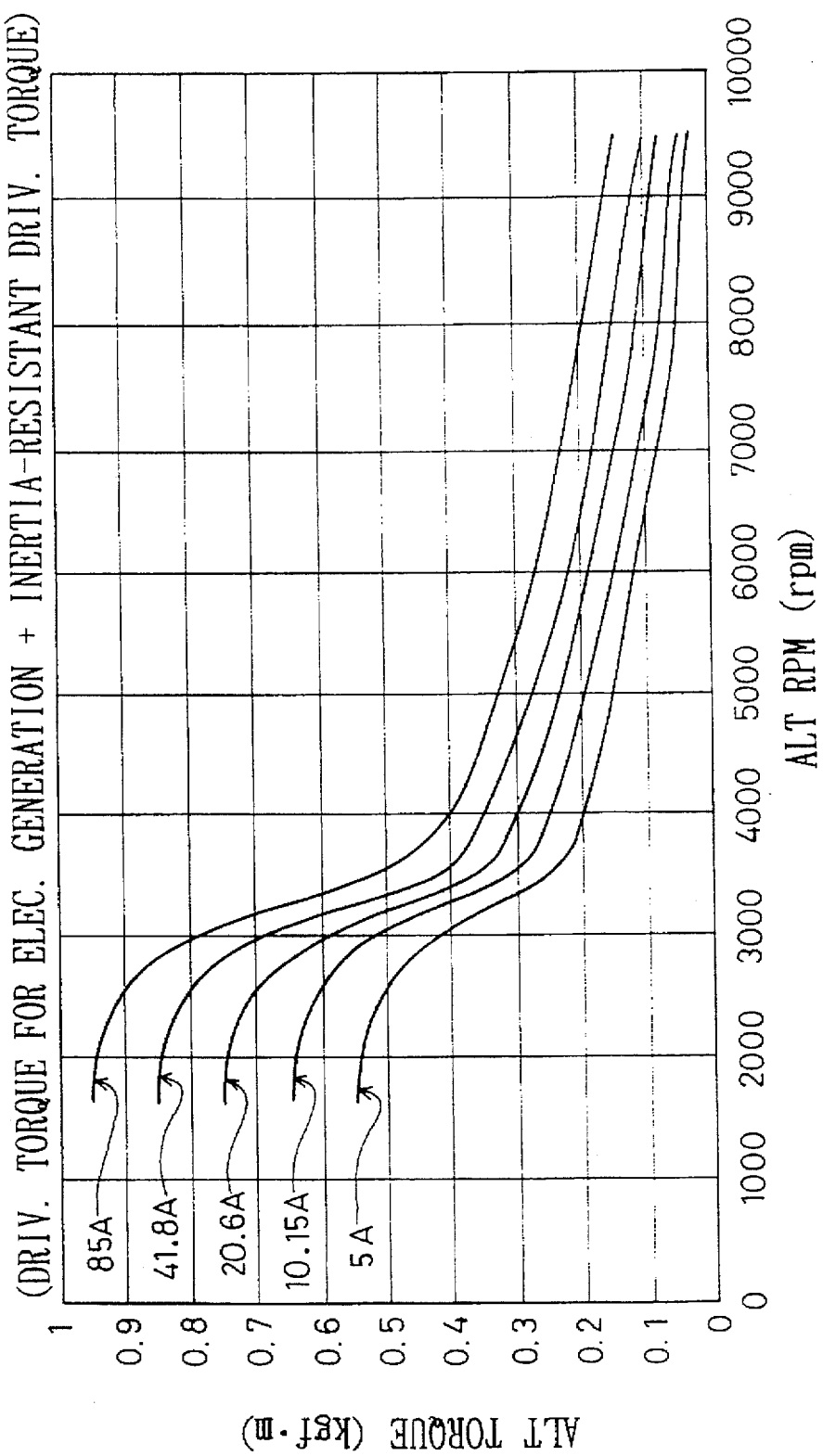

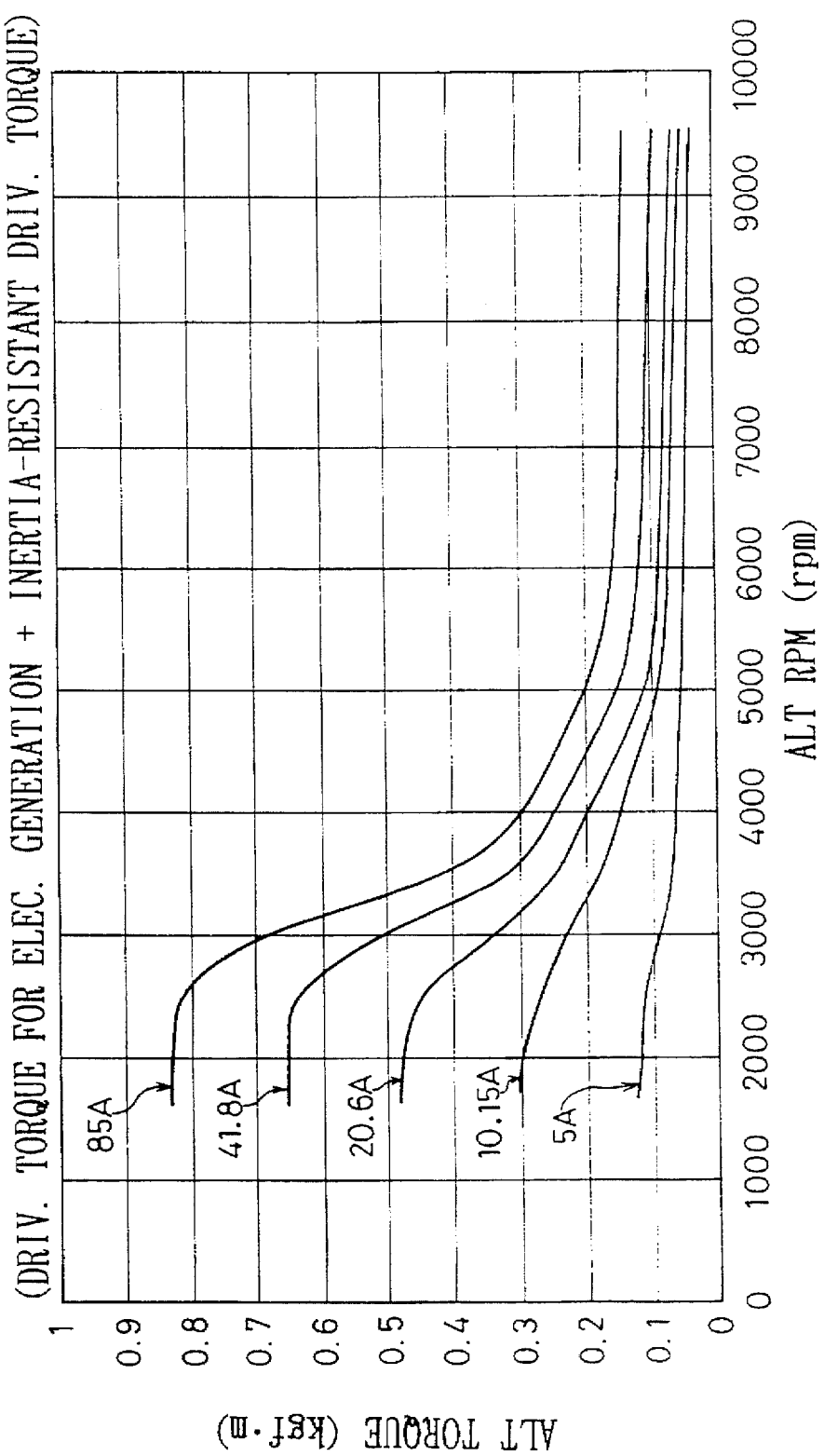

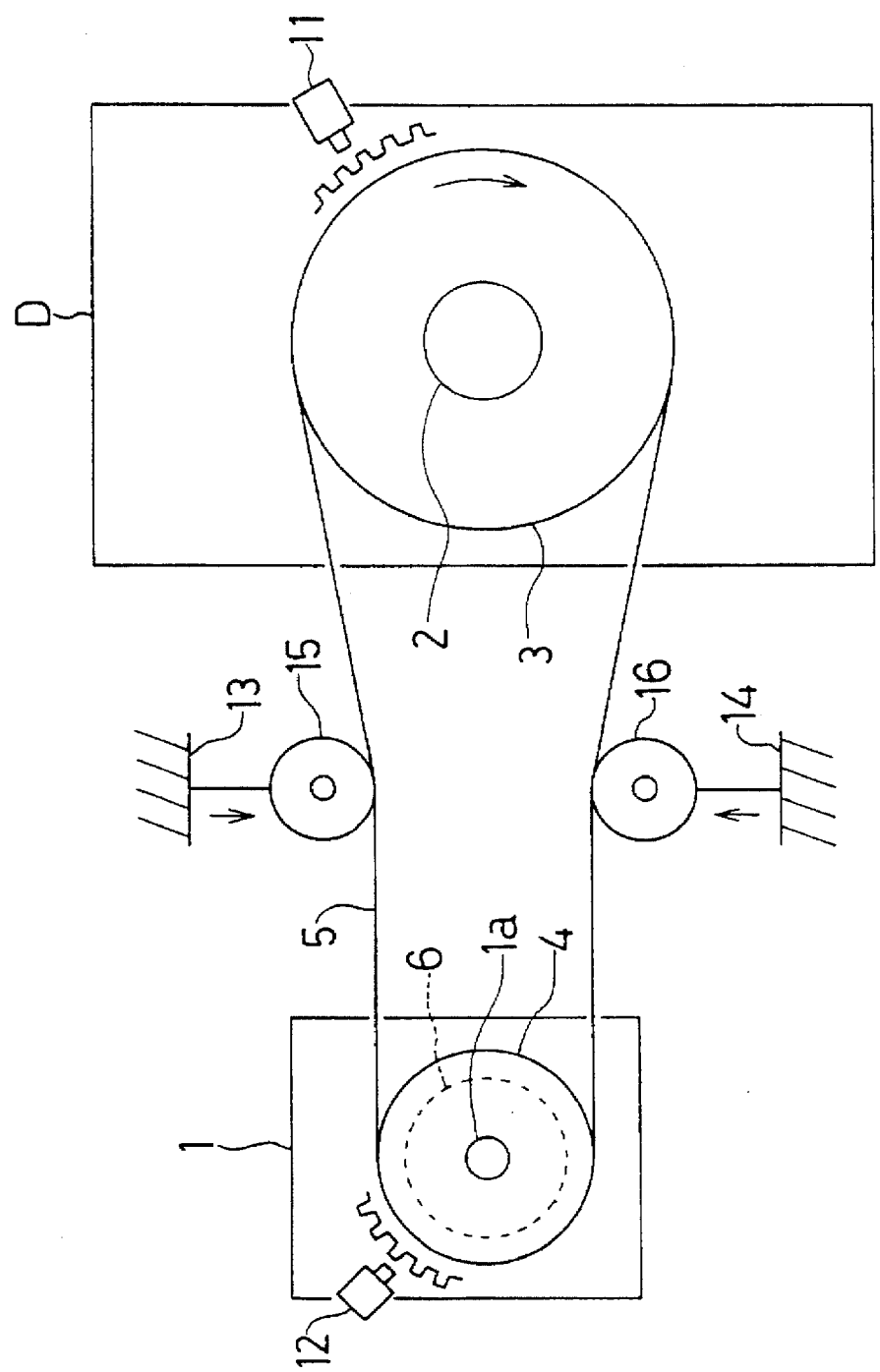

BELT TRANSMISSION DEVICE FOR ENGINE AUXILIARIES

BACKGROUND OF THE INVENTION

This invention relates to a belt transmission device for engine auxiliaries in which the transmission of a rotatively driving force from a crank shaft to an auxiliary machine such as an alternator via a transmission belt is established and interrupted by a one-way clutch in accordance with slight variations in angular velocity of the crank shaft, and in particular relates to measures for avoiding a mis-locking of the one-way clutch.

In the case that an alternator as an auxiliary machine for engine is driven into rotation by a crank shaft of a vehicle engine via a transmission belt, the following problems occur due to slight variation in angular velocity (hereinafter, referred to as variation in angular velocity) of the crank shaft.

In the above-mentioned alternator, a rotor power-transmittably connected to an alternator shaft as an auxiliary machine shaft has large inertia for rotation (inertial moment). Therefore, torque required for rotatively driving the rotor against the inertia for rotation (hereinafter, referred to as inertia-resistant driving torque) is also large. On the other hand, torque required for electrical generation as a load (hereinafter, referred to as driving torque for electrical generation in the case of the alternator or referred to as driving torque for load in the case of auxiliaries) is small since it is used only for allowing the rotor to traverse the magnetic field of a stator. Accordingly, when the rotor is driven into rotation by the crank shaft, an inverse power transmission temporally occurs in a rotation transmission path from the crank shaft to the rotor via the transmission belt. In other words, at the time of decrease in angular velocity in the case of slight variation in angular velocity (hereinafter, referred to as the time of decrease in angular velocity) of the crank shaft, the rotor is forcedly reduced in rotational speed so that the rotating inertia torque of the rotor is transmitted to the crank shaft. At the time of increase in angular velocity in the case of slight variation in angular velocity (hereinafter, referred to as the time of increase in angular velocity) of the crank shaft, the speed-reduced rotor is accelerated with the rotatively driving force of the crank shaft by an amount of reduction in rotational speed thereof.

For the inverse power transmission, the inertia-resistant driving torque at the time of increase in angular velocity of the crank shaft is required additionally by the amount of reduction in rotational speed. Such large torque must be borne by the transmission belt, thereby resulting in noise production due to belt slip and early breakage of the belt.

To cope with the above problem, Applicant has proposed, in a preceding patent application (Japanese Patent Application Laid-Open Gazette No.61-228153), a technique in which a one-way clutch is provided in a rotation transmission path between a crank shaft and a rotor via a transmission belt, a rotatively driving force from the crank shaft is transmitted to the rotor at the time of increase in angular velocity of the crank shaft and the transmission of the rotating inertia torque from the rotor to the crank shaft is interrupted at the time of decrease in angular velocity of the crank shaft.

According to the proposed technique, at the time of decrease in angular velocity of the crank shaft, since the inverse power transmission from the rotor to the crank shaft is not established, reduction in rotational speed of the rotor is correspondingly avoided so that the inertia-resistant driving torque can be decreased at the time of increase in angular velocity, thereby substantially reducing the torque to be borne by the transmission belt. For example, if it is assumed that the load for electrical generation is 0, the driving torque for electrical generation is also 0 so that it is essential only that slight inertia-resistant driving torque corresponding to an amount of natural reduction in rotational speed of the rotor due to mechanical losses or the like is supplied. Accordingly, the total driving torque to be borne by the belt for increase and decrease in rotational speed of the rotor approaches zero thereby resulting in prevention of belt slip and extension of belt life.

However, all kinds of one-way clutches cannot be necessarily applied to the belt transmission device. In detail, the one-way clutch includes a driving member power-transmittably connected to the crank shaft side and a driven member power-transmittably connected to the rotor side and switches between the locked and freed states of the driving and driven members in accordance with increase and decrease in angular velocity which is transmitted to the driving member in the case of slight variation in angular velocity of the crank shaft. The switching operation is not established at the instant time when the driving member is turned to "increase" in angular velocity but is generally delayed for a certain moment. In other words, when the switching is made from the freed state to the locked state, the driving member is relatively shifted by an angle corresponding to a certain operational delay with respect to the driven member so that the substantial locked state is established.

Therefore, as shown in FIG. 3b, a one-way clutch of which the angle β of operational delay is excessively large causes a mis-locking that the clutch is not locked at the time of increase in angular velocity by a certain amount so that the rotatively driving force of the crank shaft cannot be securely transmitted at each time of increase in annular velocity.

If the angle of operational delay of the one-way clutch is set to be excessively small instead, a mis-locking due to slip of the one-way clutch occurs, namely, the clutch is difficult to lock so that torque cannot be transmitted. For example, as shown in FIG. 2, in the case of a one-way clutch of outer roller type in which a clutch roller 10 is rotatably interposed between an outer race 7 as a driving member and an inner race 8 as a driven member, when the inner periphery 7a of the outer race 7 is formed so that an angle α of tilt thereof becomes large, the angle β of operational delay becomes small. However, if the angle α of tilt is excessively large, the clutch roller 10 is easy to slip on the inner periphery 7a of the outer race 7 and on the outer periphery 8a of the inner race 8 so that it becomes difficult to securely establish a wedging effect of the roller 10. This also invites a mis-locking.

The present invention has been made in view of the foregoing problems and has its object of suitably setting the upper limit of an angle of operational delay at the switching operation between locked and freed states of driving and driven members of a one-way clutch to allow the one-way clutch to effectively respond to variation in angular velocity of a crack shaft so as not to cause a mis-locking, thereby securely preventing a slip of the transmission belt and extending a belt life.

SUMMARY OF THE INVENTION

To attain the above object, in the present invention, an angle of operational delay of a one-way clutch is set to be smaller than a specified angle of displacement of slight variation in angular velocity to be transmitted to a driving member of the one-way clutch so that the one-way clutch is securely locked at the time of increase in angular velocity of a crank shaft within the rotational speed region where the crank shaft rotates showing an angle of displacement larger than the specified angle of displacement.

More specifically, in the invention of claim 1, a belt transmission device for engine auxiliaries comprises: an engine having a crank shaft; an auxiliary machine having a rotor with certain inertia for rotation and an auxiliary machine shaft power-transmittably connected to the rotor; a transmission belt wound between the crank shaft of the engine and the auxiliary machine shaft for transmitting a rotatively driving force of the crank shaft associated with slight variation in angular velocity to the auxiliary machine shaft to drive the rotor of the auxiliary machine into rotation; and a one-way clutch which is provided in a rotation transmission path leading from the crank shaft to the rotor of the auxiliary machine and has a driving member power-transmittably connected to the crank shaft side and a driven member power-transmittably connected to the rotor side. The one-way clutch is switched to a locked state of the driving and driven members at the time of increase of slight variation in angular velocity of the crank shaft to transmit the rotatively driving force of the crank shaft to the rotor and is switched to a freed state of the driving and driven members at the time of decrease of slight variation in angular velocity of the crank shaft to interrupt transmission of rotating inertia torque from the rotor to the crank shaft. An angle of operational delay of the one-way clutch until the one-way clutch is switched from the freed state to the locked state of the driving and driven members at the time of increase of slight variation in angular velocity of the crank shaft is set to be smaller than a specified angle of displacement of slight variation in angular velocity to be transmitted to the driving member.

Under the above structure, when the crank shaft of the engine is increased in angular velocity, the one-way clutch becomes in the locked state so that the rotation transmission path leading from the crank shaft of the engine to the rotor of the auxiliary machine is established. As a result, the rotor is driven into rotation by a rotatively driving force of the crank shaft. On the other hand, when the crank shaft is decreased in angular velocity, the one-way clutch becomes in the freed state so that the rotation transmission path is interrupted. As a result, rotating inertia torque of the rotor can be prevented from being inversely transmitted to the crank shaft through the transmission belt. Then, when the rotor is gradually decreased in rotational speed due to load applied to the auxiliary machine and mechanical losses such as frictional resistance and the crank shaft is increased again in angular velocity, the one-way clutch turns to the locked state so that a rotatively driving force of the crank shaft is transmitted to the rotor of the auxiliary machine through the one-way clutch.

In this case, after the angular velocity of the driving member of the one-way clutch turns into increase and is then increased by the angle of operational delay, the rotational speed of the rotor is then reduced to the angular velocity of the driving member, that is, the driven member is reduced in angular velocity, so that the driving and driven members are switched from the freed state to the locked state.

The angle of displacement (range of displacement) of slight variation in angular velocity generally tends to become larger toward the lower speed side of the rotational speed region. In other words, the low rotational speed region shows large variation in angular velocity so that the angle of displacement also becomes large. Accordingly, in the rotational speed region showing an angle of displacement larger than the specified angle of displacement, that is, in the rotational speed region lower in rotational speed than the rotational speed region showing the specified angle of displacement, while a period of variation in angular velocity becomes longer, the angle of displacement comparatively becomes larger so that the rate of reduction in rotational speed of the rotor becomes small at the time of decrease in angular velocity of the crank shaft. This increases the angular velocity of the driving member by the angle of operational delay at a relatively early stage thereby securely establishing the locked state of the one-way clutch at the time of increase in angular velocity of the crank shaft. As a result, a mis-locking of the one-way clutch can be securely avoided in the low rotational speed region showing large variation in angular velocity so that the load applied to the belt in association with variation in angular velocity of the crank shaft can be effectively reduced. The reduction in load prevents a belt slip and presents an extended belt life.

In the invention of claim 2 according to the invention of claim 1, the specified angle of displacement is an angle of displacement (e.g., 1.6°) of slight variation in angular velocity in a region of high rotational speed (e.g., 5000 rpm) of the engine.

Under the above structure, since the specified angle of displacement is set to an angle of displacement of slight variation in angular velocity in a region of high rotational speed of the engine, the effects of the invention of claim 1 can be securely obtained in a wide commonly-used rotational speed region between an idling rotation and a middle-speed rotation.

In the invention of claim 3 according to the invention of claim 2, in the case that the one-way clutch is placed at a position where the one-way clutch transmits to the auxiliary machine shaft a rotatively driving force transmitted from the crank shaft through the transmission belt and the speed change ratio of the auxiliary machine shaft to the crank shaft is 2, the angle of operational delay of the one-way clutch is set to a value smaller than 1.6°.

In general, an angle of displacement of slight variation in angular velocity of the crank shaft is gradually decreased in accordance with increase in rotational speed of the crank shaft. In detail, while in the idling rotation (e.g., 800 rpm) the range of displacement of the crank shaft is approximately ±3° and thus the angle of displacement is 6°, in the high-speed rotation (e.g., 5000 rpm) the former is approximately ±0.4° and thus the latter is 0.8°. In the high-speed rotation, if the speed change ratio of the driven shaft to the crank shaft is 2, the angle of displacement of slight variation in angular velocity to be transmitted to the driving side of the one-way clutch is doubled to 1.6°. Accordingly, the effects of the invention of claim 1 can be obtained further securely in this case.

In the invention of claim 4 according to the invention of claim 1, the auxiliary machine is an alternator, which is provided with a rotor having inertia for rotation larger than a load for electrical generation.

Under the above structure, the rotor of the alternator is driven into rotation by a rotatively driving force of the crank shaft. While the rotor of the alternator has inertia for rotation larger than a load for electrical generation and thus has large inertia-resistant driving torque as also explained above in the description of the background art, it requires as driving torque for load only small driving torque for electrical generation for allowing the rotor to traverse the magnetic field. Therefore, the alternator is one of engine auxiliaries which most easily produces an inverse power transmission. Accordingly, the effects of the invention of claim 1 can be outstandingly obtained in the invention of claim 4.

Further, since the driving torque for electrical generation tends to increase inversely with the number of rotations of the rotor, inertia-resistant driving torque can be securely reduced in the low rotational speed region. Accordingly, even if there is a load for electrical generation, the total driving torque can be restricted to a lower level over the wide rotational speed region.

BRIEF DESCRIPTION OF THE DRAWINGS

FIG. 4 is an enlarged cross section schematically showing a portion of another type of one-way clutch applicable to this invention.

FIGS. 5 to 9 each show Test 1:

FIG. 5 is a graph showing the relationship between driving torque for electrical generation of the alternator shaft and the rpm thereof when a load for electrical generation is 85A;

FIG. 6 is a graph showing the relationship between inertia-resistant driving torque of the alternator shaft and the rpm thereof in a comparative example;

FIG. 7 is a graph showing the relationships between respective total driving torque of the alternator shaft according to respective loads for electrical generation and the rpm thereof in the comparative example;

FIG. 9 is a diagram of the example of this invention corresponding to FIG. 8, in which respective total torque of the alternator shaft according to respective loads for electrical generation are shown in relation with the rpm thereof.

FIGS. 10 to 14 show Test 2:

FIG. 10 is a diagram explaining a test for checking characteristics of respective belt transmission devices according to an example of this invention and a comparative example;

FIG. 11 shows respective wave forms illustrating respective variation in angular velocity of a crank shaft, a driven pulley and an alternator shaft in the example of this invention;

FIG. 12 is a graph corresponding to FIG. 11, in which respective variation in angular velocity of a crank shaft and an alternator shaft in the comparative example is illustrated;

FIG. 13 shows respective wave forms illustrating respective variation in tension of the tight side and slack side of belt in the example of this invention;

FIG. 14 is a graph corresponding to FIG. 13, in which respective variation in tension of the tight side and slack side of belt in the comparative example is illustrated.

DETAILED DESCRIPTION OF THE INVENTION

Figure 1:
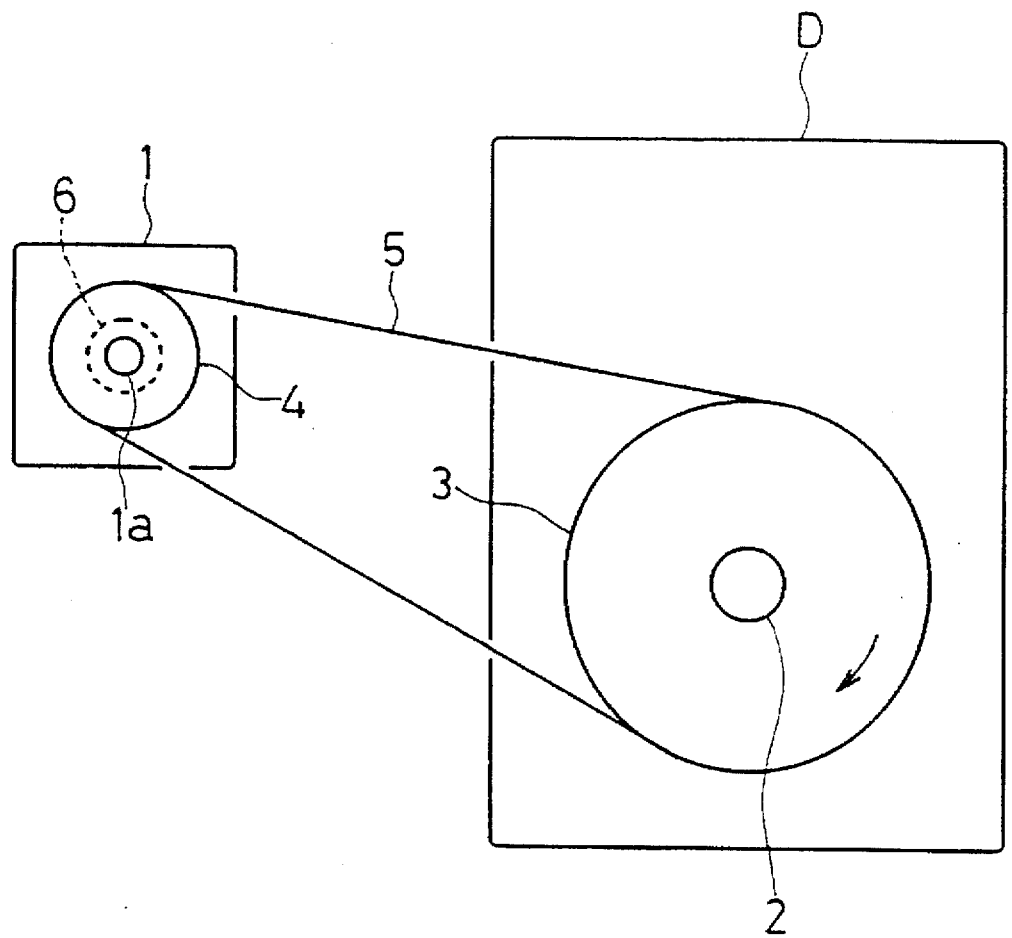
FIG. 1, is a front elevation schematically showing the whole structure of a belt transmission device according to an embodiment of the present invention.

Description will be made below about an embodiment of this invention with reference to the drawings. FIG. 1 schematically shows the whole structure of a belt transmission device of an alternator 1 as an auxiliary machine for engine according to this embodiment.

The belt transmission device is disposed on the front side of a four-cylinder diesel engine D mounted on a vehicle, and is so composed that a V-ribbed belt 5 as a transmission belt is wound between a driving pulley 3 connected to the front-side end of a crank shaft 2 of the engine D in rotational cooperation and a driven pulley 4 power-transmittably connected to an alternator shaft 1a as an auxiliary machine shaft of the alternator 1. The alternator shaft 1a of the alternator 1 is provided with an unshown rotor, which has inertia for rotation larger than a load for electrical generation, in rotational cooperation. The driving pulley 3 and the driven pulley 4 are set so that the speed change ratio of the alternator shaft 1a to the crank shaft 2 is 2. A one-way clutch 6 is built into the driven pulley 4. The one-way clutch 6 transmits a rotatively driving force of the crank shaft 2 to the alternator shaft 1a at the time of increase in angular velocity of the crank shaft 2 and interrupts transmission of rotating inertia torque from the rotor of the alternator 1 to the crank shaft 2.

Figure 2:
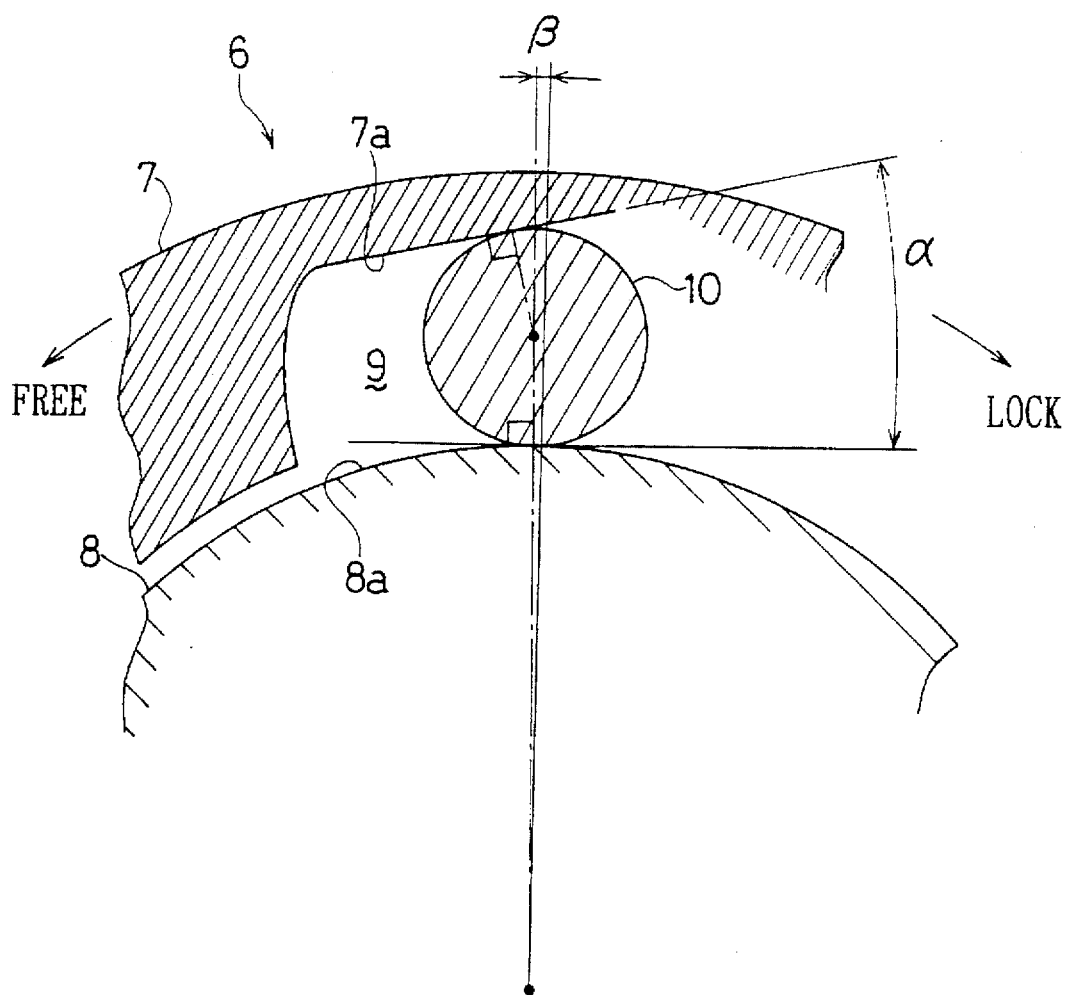
FIG. 2 is an enlarged cross section schematically showing a portion of a one-way clutch interposed between an alternator shaft of an alternator and a driven pulley.

As shown in FIG. 2, the above-mentioned one-way clutch 6 is an outer roller type one which includes an outer race 7 as a driving member, an inner race 8 as a driven member and a plurality of clutch rollers 10, 10 ... (shown by one in the figure). The outer race 7 is connected to the driven pulley 4 in rotational cooperation and has a plurality of concavities 9 (shown by one in the figure) at the inner periphery thereof in a circumferential direction. The inner race 8 is disposed inside the outer race 8 and is connected to the alternator shaft 1a in rotational cooperation. The plurality of clutch rollers 10, 10, ... are disposed in the respective concavities 9 of the outer race 7. The inner periphery 7a of the outer race 7 in each concavity 9 is formed so as to be gradually decreased in radial distance from the outer periphery 8a of the inner race 8. In other words, the tangent passing through a contact point between the outer race 7 and the roller 10 is inclined by a specified angle $\alpha$ to the tangent passing through a contact point between the inner race 8 and the roller 10. Thereby, at the time of relative rotation of the outer race 7 in a lock direction (clockwise in the figure), each roller 10 is engaged into a space between the inner periphery 7a of the outer race 7 and the outer periphery 8a of the inner race 8 so that the relative rotation of the outer race 7 is locked (a locked state of the clutch), and on the other hand, at the time of relative rotation of the outer race 7 in a free direction (counter-clockwise in the figure), each roller 10 is disengaged so that the outer race 7 is free to rotate relatively to the inner race 8 (a freed state of the clutch). Each roller 10 is pushed counter-clockwise by an unshown clutch spring at all times.

Figure 3A:
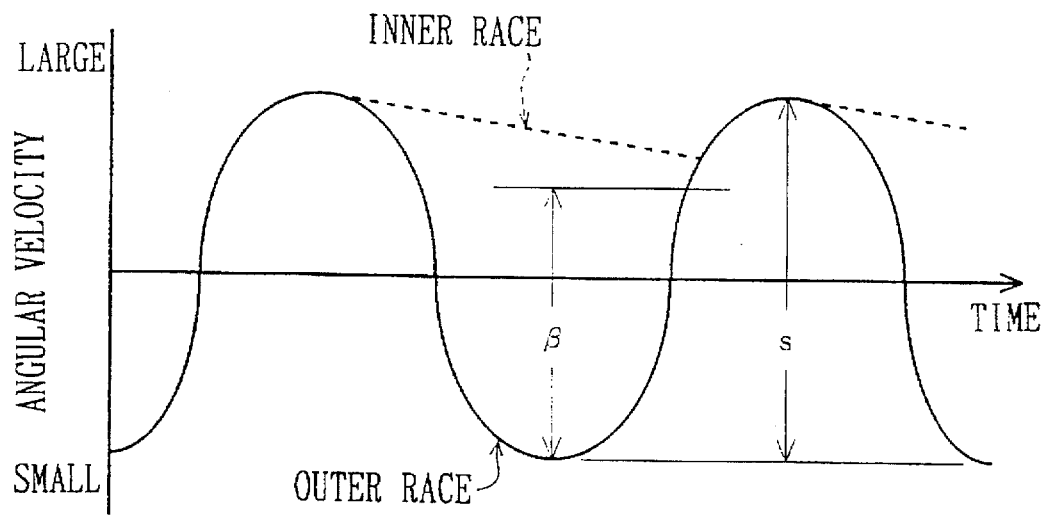
FIGS. 3a and 3b show respective wave forms illustrating operational states of the one-way clutch in the above embodiment and a conventional example for comparison.
Figure 3B:
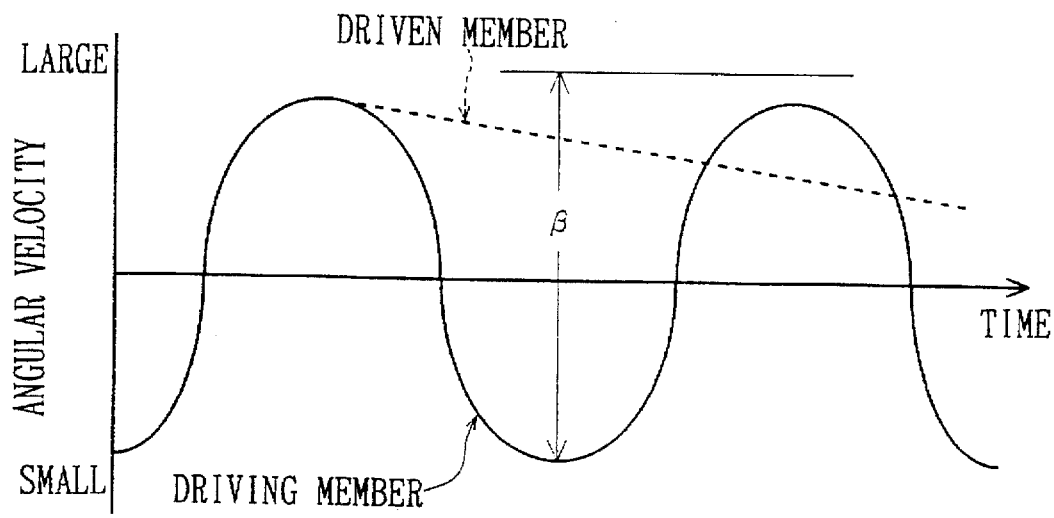

Further, as shown in FIG. 3a, the angle $\beta$ of operational delay until the one-way clutch 6 is switched from the freed state to the locked state between the outer race 7 and the inner race 8 at the time of increase in angular velocity of the crank shaft 2, is set to a value smaller than the specified angle s of displacement of slight variation in angular velocity to be transmitted to the outer race 7 in the high rotational speed region of the engine D (s>$\beta$).

More specifically, since the range of displacement of slight variation in angular velocity of the crank shaft 2 is generally ±0.4° at the time of high-speed rotation (e.g., 5000 rpm) of vehicle engine, if the change ratio of the alternator shaft 1a to the crank shaft 2 is 2, the range of displacement of the alternator shaft 1a is doubled to ±0.8° (s=1.6°). Accordingly, in this embodiment, the angle $\beta$ of operational delay of the one-way clutch 6 is set to 0.45° smaller than s=1.6°. The reason for the setting to such a small value is that the rotor of the alternator 1 is substantially large in amount of rotation reduction when the load for electrical generation is large. Since the amount of angle β of operational delay is approximately inversely proportional to the angle α of tilt of the inner periphery 7a of the outer race 7 in each concavity 9 of the one-way clutch 6, increase in angle α of tilt decreases the angle β of operational delay.

Next, operations of the belt transmission device is described. At the time of increase in angular velocity of the crank shaft 2 of the diesel engine D, the one-way clutch 6 becomes in a locked state to establish the rotation transmission path from the crank shaft 2 to the rotor of the alternator 1 through the V-ribbed belt 5, so that the rotor is driven into rotation by a rotatively driving force of the crank shaft 2. On the other hand, at the time of decrease in angular velocity of the crank shaft 2, the one-way clutch 6 becomes in a freed state to interrupt the rotation transmission path, so that the rotating inertia torque of the rotor is avoided from being inversely transmitted to the crank shaft 2 through the V-ribbed belt 5.

Thereafter, when the rotor is decreased in rotational speed due to a load for electrical generation or mechanical losses and the crank shaft 2 is increased again in angular velocity, the one-way clutch 6 turns to the locked state so that a rotatively driving force of the crank shaft 2 is transmitted to the rotor of the alternator 1 through the one-way clutch 6. In this case, the angle β of operational delay of the one-way clutch 6 is set to a value of 0.45° smaller than the angle of displacement of 1.6° of slight variation in angular velocity to be transmitted to the outer race 7 of the one-way clutch 6 in the high-rpm region of the crank shaft 2

Therefore, in the high-rpm region of the crank shaft 2, after the angular velocity of the outer race 7 of the one-way clutch 6 turns to "increase" and then increases by an amount of the angle β of operational delay, the rotor is decreased in rotational speed to the angular velocity of the outer race 7, that is, the angular velocity of the inner race 8 decreases to that of the outer race 7. At this time, the outer race 7 and the inner race 8 are substantially switched from their freed state to their locked state.

Thus, according to this embodiment, in the rpm region in which the range of displacement of slight variation in angular velocity of the crank shaft 2 is larger than that (±0.4°) in the high-rpm region of the diesel engine D, that is, in the commonly-used rpm region leading from the idling rotation speed showing the range of displacement of about ±3° to the middle rpm, while a period of slight variation in angular velocity becomes longer, the angle of displacement comparatively becomes larger so that the rate of rpm reduction of the rotor becomes small at the time of decrease in angular velocity of the crank shaft 2. This increases the angular velocity of the outer race 7 by the angle β of operational delay at a relatively early stage, thereby securely establishing the locked state of the one-way clutch 6 at each time of increase in angular velocity of the crank shaft 2. Accordingly, a mis-locking of the one-way clutch 6 can be securely prevented in the low-rpm region showing large variation in angular velocity, so that the load of the V-ribbed belt 5 associated with variation in angular velocity of the crank shaft 2 can be effectively reduced in the low-rpm region. The reduction in load prevents a slip of the V-ribbed belt 5 and presents an extended life of the belt.

In the above embodiment, the V-ribbed belt 5 is used as a transmission belt. In this invention, however, various kinds of belts other than the V-ribbed belt may be employed.

Though the above embodiment is applied to the diesel engine D, the transmission belt of this invention is also applicable to gasoline-powered engines.

Further, the above embodiment uses an outer roller type one-way clutch 6 using roller type sprags. However, if only the angle β of operational delay can be set to a value smaller than a specified angle of displacement, the type of the one-way clutch to be used is not limited. For example, as shown in FIG. 4, the one-way clutch 6 may be the type in which a plurality of cocoon-shaped sprags 10, 10, . . . (shown by one in the figure) are used. In this one-way clutch 6, each sprag 10 is held by a holder 17 so as to be inclinable within a plane orthogonal to the axis of the one-way clutch 6. Thereby, at the time of relative rotation of the outer race 7 in a lock direction (clockwise in the figure), each sprag 10 is pressed at a radially outer end thereof against the inner periphery 7a of the outer race 7 and at a radially inner end thereof against the outer periphery 8a of the inner race 8 so that the relative rotation of the outer race 7 is locked. In this case, each sprag 10 is pushed in a direction of establishment of the locked state of the clutch at all times. Reference numerals 18, 18 each show a ball for bearing which is interposed between both the races 7, 8 and supports the races 7, 8 so as to be capable of their relative rotation.

In the above embodiment, the angle β of operational delay is set to 0.45°. However, the angle of operational delay can be conveniently set in accordance with characteristics of angular velocity variation of engines, the commonly-used rotational speed region or the like.

Further, in the above embodiment, the one-way clutch 6 is interposed between the alternator shaft 1a and the driven pulley 4 mounted on the alternator shaft 1a. However, the position to be disposed of the one-way clutch 6 can be freely designed.

Furthermore, in the above embodiment, the alternator 1 is used as an auxiliary machine for engine. Other auxiliaries for engine such as a compressor for car air conditioner, a pump for power steering and a water pump are applicable to this invention.

TEST 1

Description will be made about Test 1 carried out in relation to torque necessary for driving the alternator of the above-mentioned belt transmission device.

Figure 5:
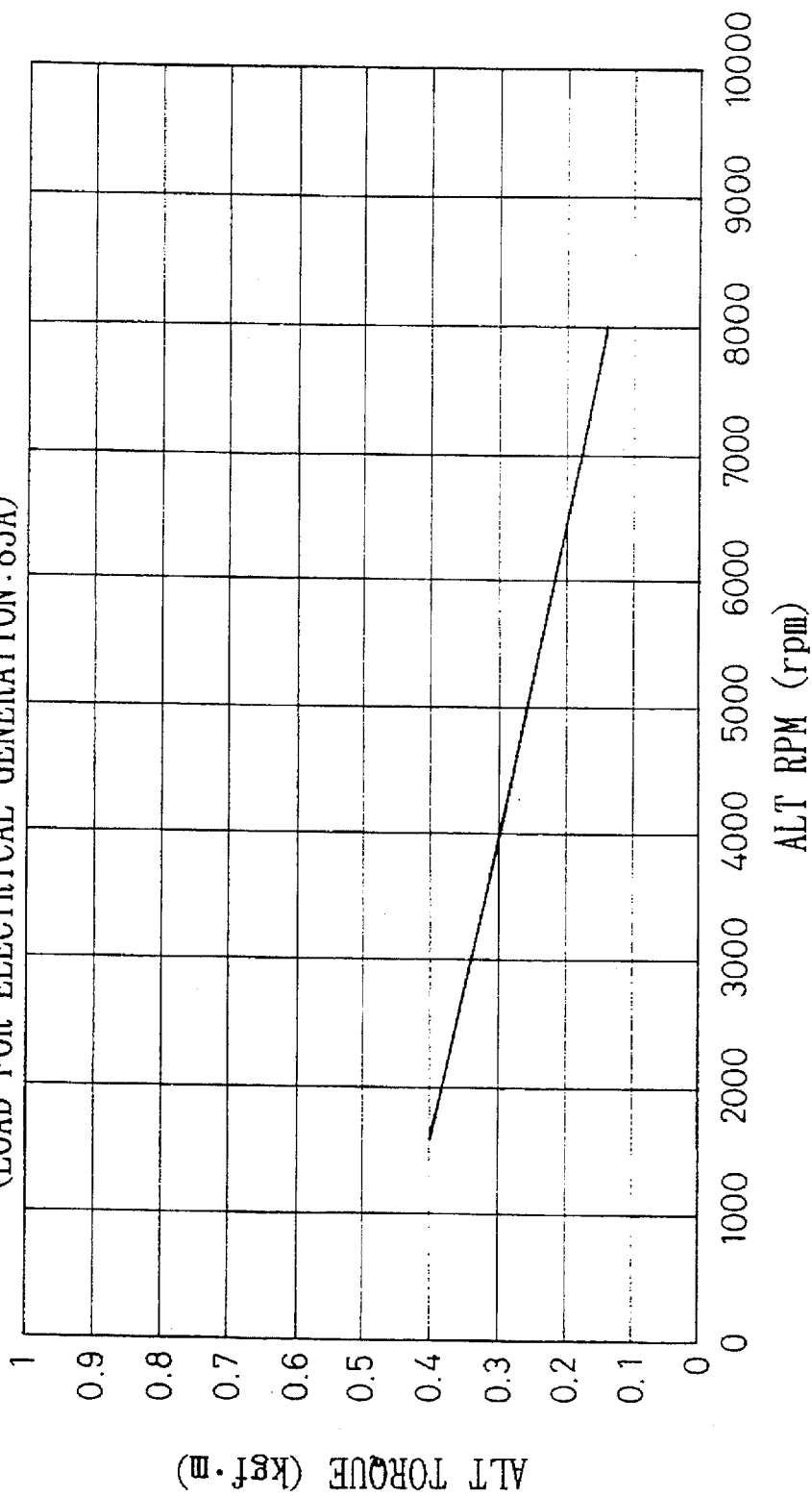

First of all, a description of a comparative example is made about the case that the driven-side pulley mounted on the alternator is a fixed pulley containing no one-way clutch as mentioned in the above embodiment. FIG. 5 shows the relationship between driving torque for electrical generation (ALT torque) and the rotational speed of the alternator (ALT rpm) in the case that the alternator has electrical generation characteristics shown in Table 1 and the load for electrical generation is 85A.

TABLE 1

| rotational speed (rpm) | 1600 | 4000 | 8000 |
|---|---|---|---|
| maximum current (A) | 45 | 85 | 85 |
| maximum voltage (V) | 14.5 | 13.5 | 12.5 |

Figure 6:
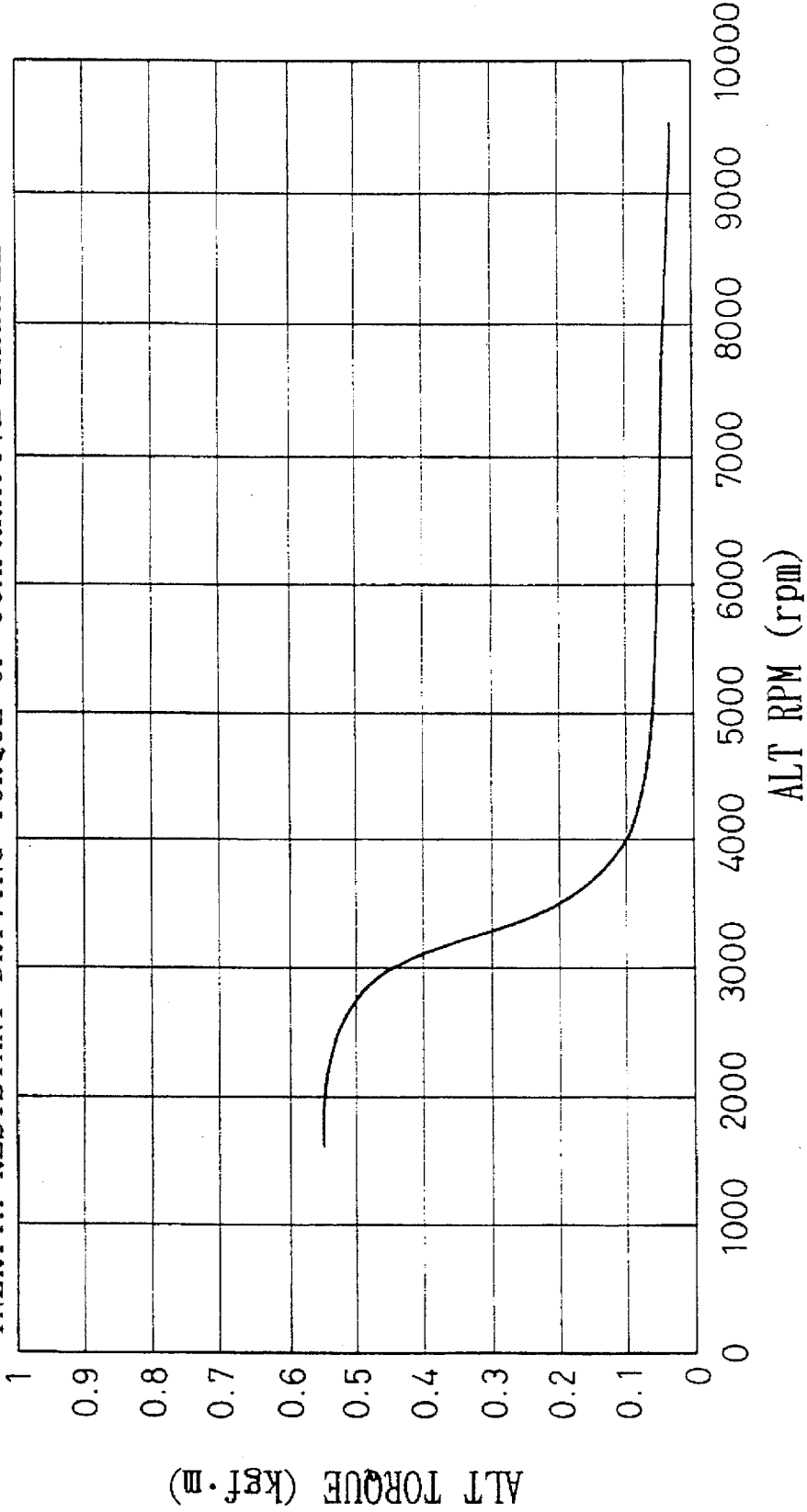

Next, test is carried out about inertia-resistant driving torque required to rotate the rotor of the alternator against rotating inertia torque of the rotor by an amount of rotation reduction due to variation in angular velocity of the crank shaft. In this test, characteristics of the inertia-resistant driving torque (ALT torque) was obtained based on measured data in the case that the rotational ratio r of the auxiliary machine is 2 and the rotating inertia torque $I_{PA}$ is 0.24 kgf·m·sec². The results are shown in FIG. 6.

Since the value of the inertia-resistant driving torque can be also theoretically obtained from the below-mentioned formulae (1) and (2), they are shown, for reference purpose, as follows:

$$Am = (t_n / 100) \times (m \cdot W_n^2) / 2 \quad (1)$$

wherein Am is the amplitude of variation in angular velocity of the crank shaft 2 and its unit is (rad/sec)², $t_n$ is a rotation variation ratio (± %) at the n rpm of the crank shaft, m is the number of engine cylinders and $W_n$ is an angular velocity (rad/sec) at the n rpm of the crank shaft;

$$T_{RA} = (1 / 2^{1/2}) \times Am \times r \times I_{PA} \quad (2)$$

wherein $T_{RA}$ is inertia-resistant driving torque and its unit is kgf·m, r is a rotational ratio (DR/DN) of the auxiliary machine and $I_{PA}$ is rotating inertia torque (kgf·m·sec²) of the auxiliary machine.

Consequently, as shown in FIG. 7, there is obtained the total driving torque (ALT torque) of the comparative example in which the driving torque for electrical generation, shown in FIG. 5, at the time of a load for electrical generation of 85A is added to the inertia-resistant driving torque shown in FIG. 6. In the same manner, respective total driving torque in the cases of loads for electrical generation of 41.8A, 20.6A, 10.15A and 5A is shown in the same figure. It is apparent from FIG. 7 that regardless of the magnitude of load for electrical generation large total driving torque is required at 4000 or less rpm.

Next, an example of this invention is described. The driving torque for electrical generation is the same as in the comparative example. For example, in the case of a load for electrical generation of 85A, the ALT torque is the same as in FIG. 5.

Figure 8A:
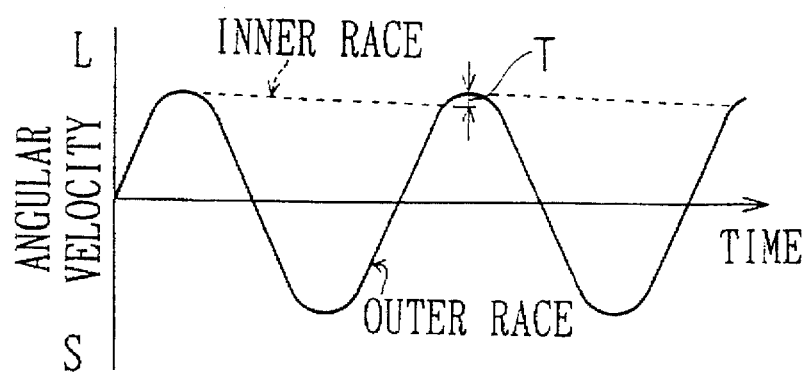
FIGS. 8a, 8b, 8c and 8d show respective wave forms illustrating amounts of rotation reduction of the alternator shaft according to respective loads for electrical generation in an example of this invention.
Figure 8B:
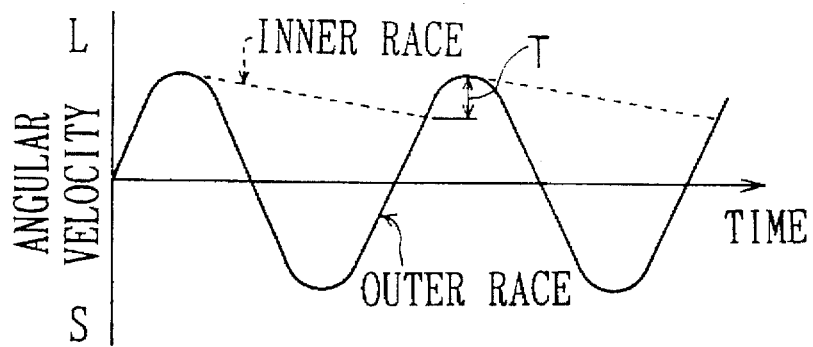
Figure 8C:
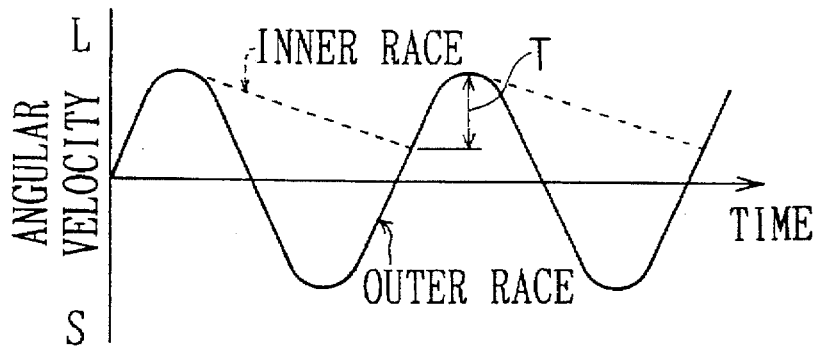
Figure 8D:
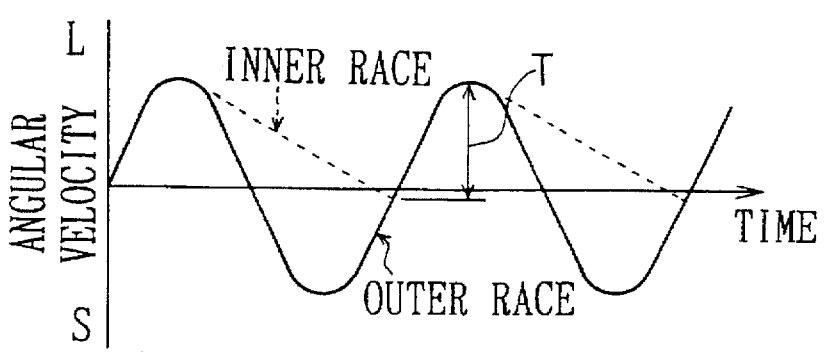

In the example of this invention, since no rotation reduction occurs due to variation in angular velocity of the crank shaft, the inertia-resistant driving torque is only an amount of rotation reduction associated with mechanical losses such as friction resistance. Accordingly, the total driving torque in the case of a load for electrical generation of 0A is only a slight amount T of rotation reduction shown in FIG. 8a. As the load for electrical generation is gradually increased to 10A, 20A and 80A, the amount T of rotation reduction of the rotor is correspondingly increased as shown in FIG. 8b to 8d thereby also increasing the total driving torque. In view of an absorption ration of angular velocity variation (((angle of displacement)−(amount of rotation reduction)) / (angle of displacement)×100), the ratio is 92.9% in the case of a load for electrical generation of 5A, while it is decreased to 60.84 in the case of a load for electrical generation of 20.6A.

FIG. 9 shows characteristics of respective total driving torque in the cases of a load for electrical generation of 85A to 5A in the example of this invention. As is apparent from the figure in comparison with the comparative example of FIG. 7, the total driving torque is reduced as a whole regardless of loads for electrical generation. In particular, as the load for electrical generation is decreased, the total driving torque is substantially reduced.

TEST 2

In order to check belt transmission characteristics of an example of this invention in which a pulley with a built-in one-way clutch is attached as a driven pulley to the alternator, test is carried out to measure respective variation in angular velocity of the crank shaft and the alternator shaft of the 4-cylinder diesel engine and to measure respective variation in tension of the tight side and slack side of the V-ribbed belt. For comparison, the same measurement is subjected to a comparative example in which, instead of the pulley with a built-in one-way clutch, a fixed pulley connected to the alternator shaft in rotational cooperation is attached as a driven pulley to the alternator.

To carry out the above test, as shown in FIG. 10, a V-ribbed belt 5 is wound between a driving pulley 3 mounted on a crank shaft 2 and a driven pulley 4 mounted on an alternator shaft 1a and the pulleys 3, 4 are provided with electromagnetic pickups 11, 12 respectively so as to detect respective angular velocities of the pulleys 3, 4. To respective belt spans between both the pulleys 3, 4, respective idle pulleys 15, 16 supported through respective load cells 13, 14 are pushed so as to detect the respective tensions of the spans by the load cells 13, 14. The crank shaft 2 was rotated under an initial tension of belt of 588N (60 kgf) at specified rpm (720 rpm in the example of this invention and 880 rpm in the comparative example). For the V-ribbed belt 5, a belt having four ribs and a 785 mm pitch length is used. The reason for the 880 rpm in the comparative example is that the rpm of below 880 rpm would produce excessively large variation in angular velocity to break the V-ribbed belt 5 at an early stage.

Figure 11:
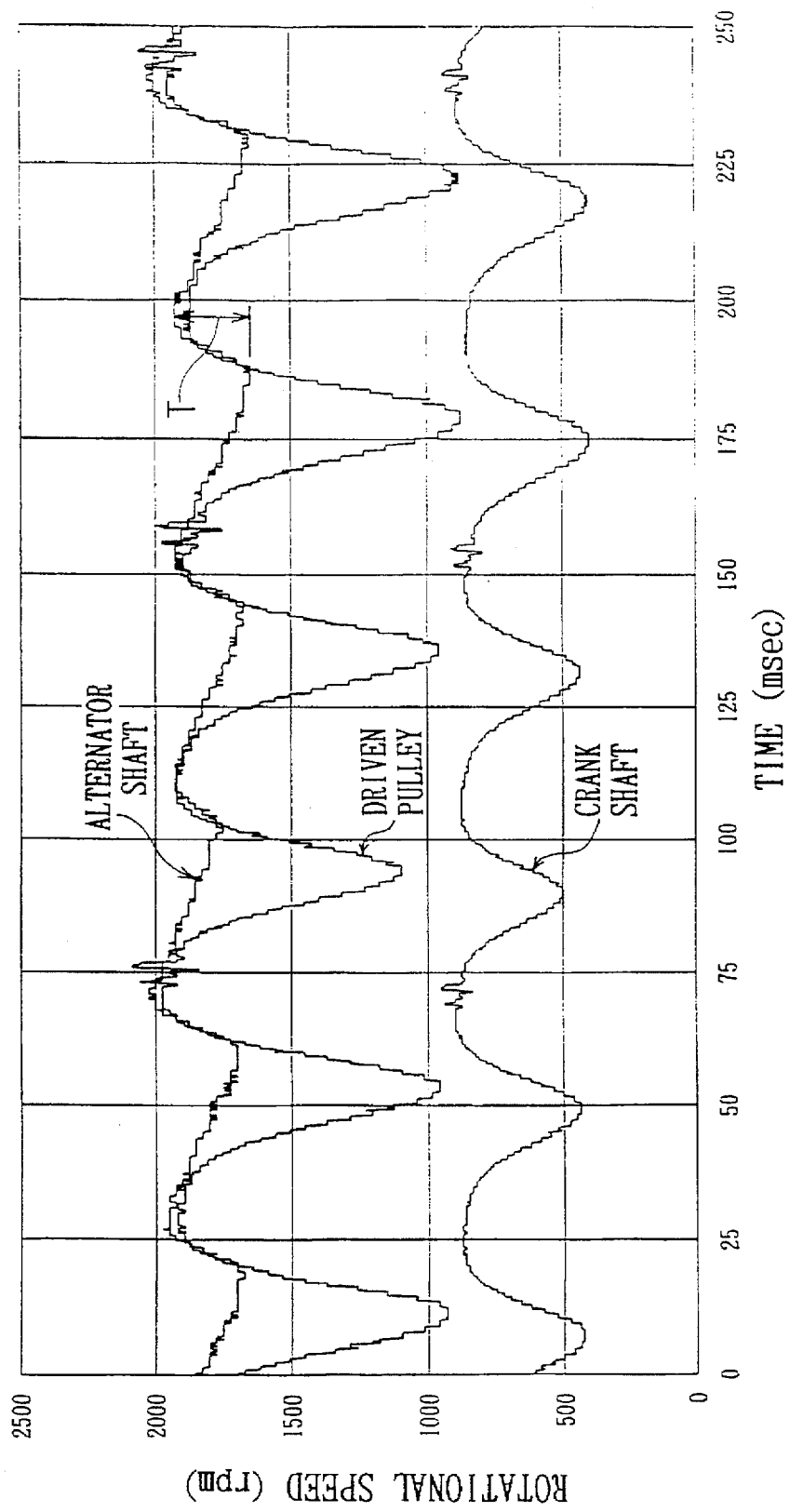
Figure 12:
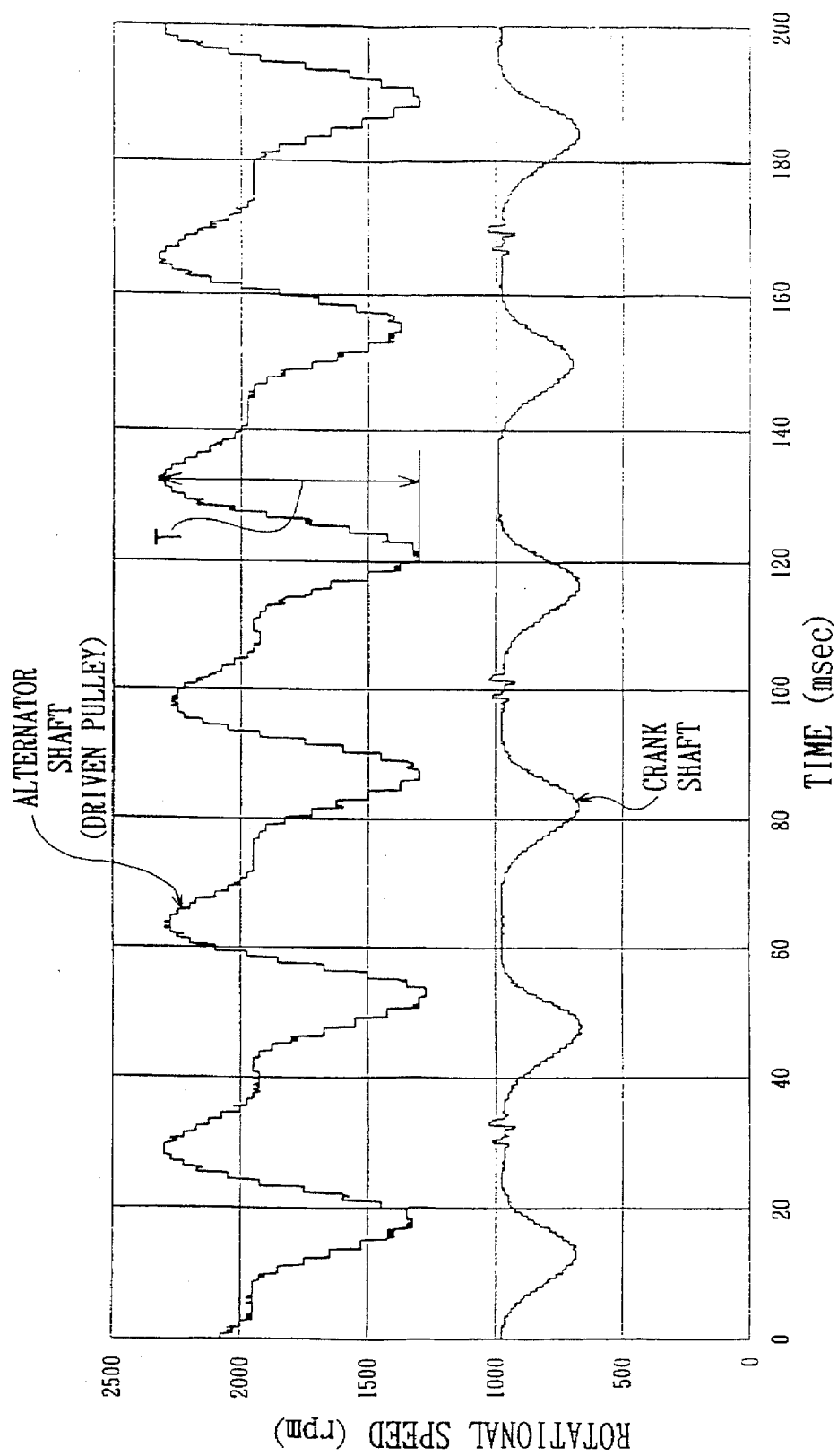
Figure 13:
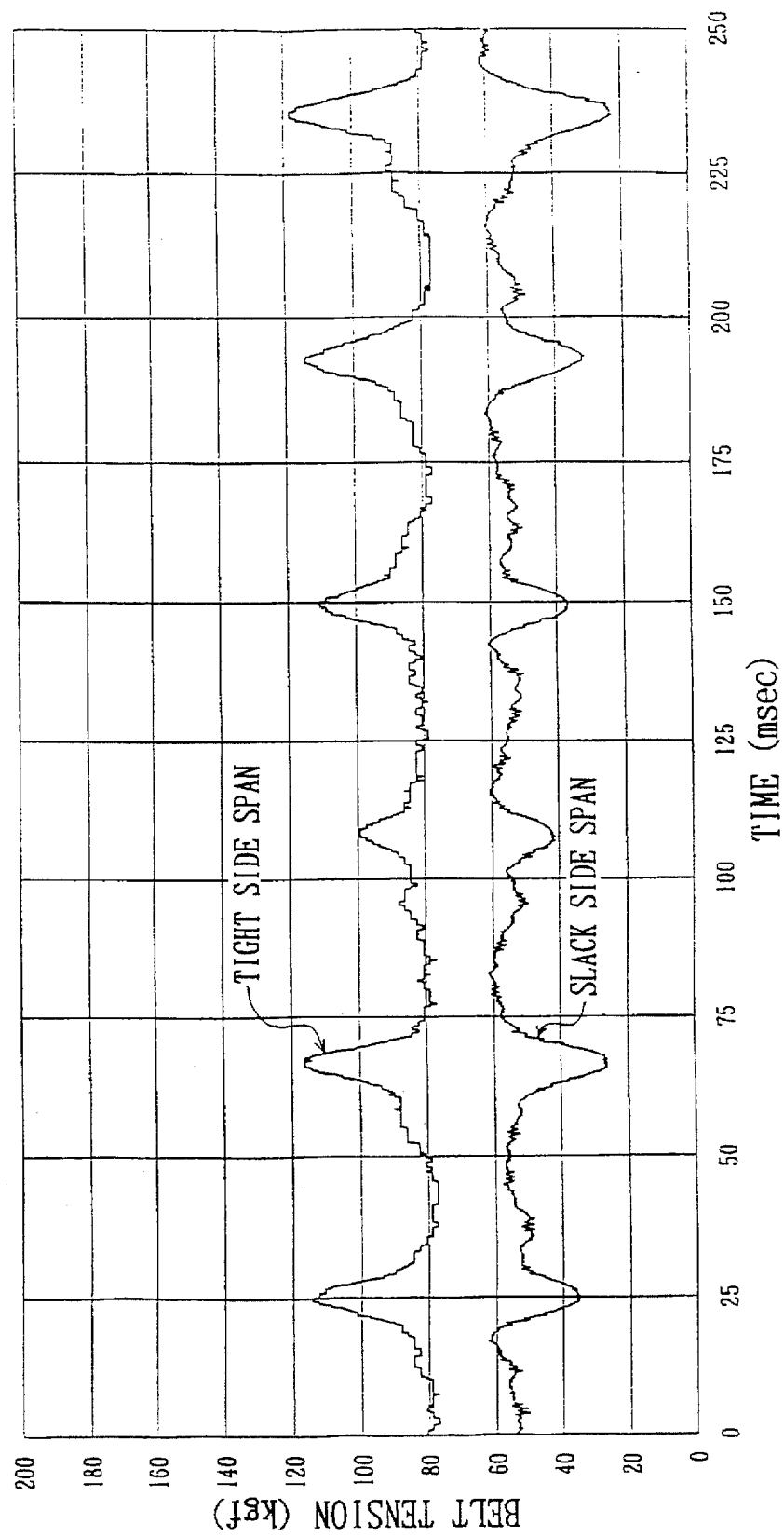
Figure 14:
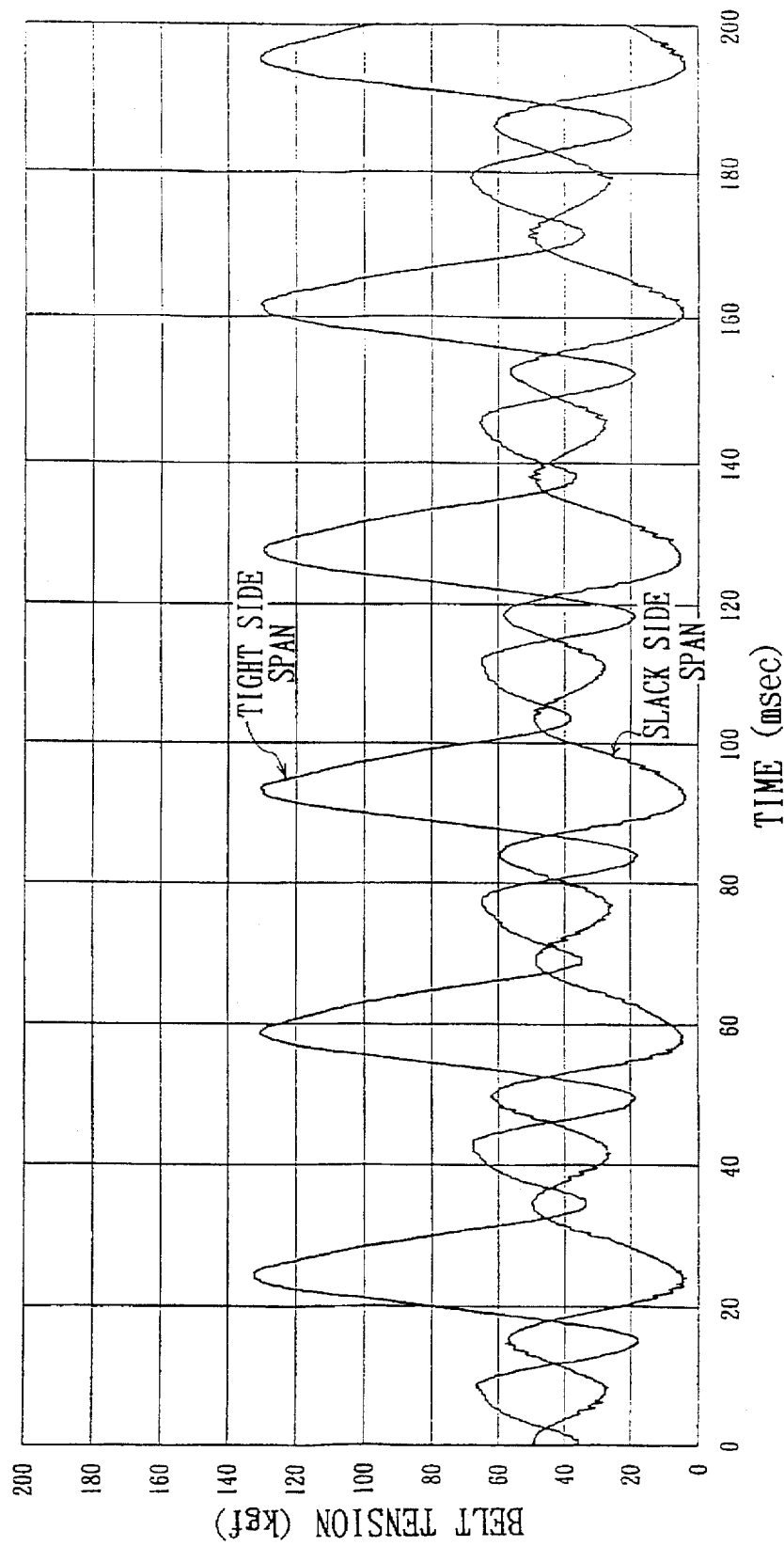

FIG. 11 shows respective variation in angular velocity of the crank shaft 2, the driven pulley 4 and the alternator shaft 1a in the example of this invention. FIG. 12 shows respective variation in angular velocity of the crank shaft 2 and the alternator shaft 1a in the comparative example. In the case of the four-cylinder engine, two explosions are carried out per rotation of the crank shaft 2. Accordingly, since the rotational speed of the crank shaft 2 is 720 rpm in the example of this invention, a period of variation in angular velocity of the crank shaft 2 is about 41.7 msec. On the other hand, the period in the comparative example is 34.1 msec. Since the crank shaft 2 is provided with no flywheel, the variation in angular velocity appears in amount larger than in the actual condition. FIG. 13 shows respective variation in tension of the tight-side and slack-side spans of the V-ribbed belt 5 in the example of this invention. FIG. 14 shows respective variation in tension of the tight-side and slack-side spans of the V-ribbed belt 5 in the comparative example.

First of all, if FIGS. 11 and 12 are compared with each other, the amount T of rotation reduction of the alternator shaft 1a in the example of this invention is smaller than that in the comparative example. As is evident from this, the total driving torque is reduced in the example of this invention. In other words, the load of the V-ribbed belt 5 is lessened by an amount of reduction in total driving torque. If this is seen in view of the crank shaft 2, the range of displacement of slight variation in angular velocity in the example of this invention is 430 to 860 rpm larger than the range of displacement (680 to 980 rpm) in the comparative example. That is, in the comparative example, at the time of decrease in angular velocity of the crank shaft 2, the rotating inertia moment of the rotor is inversely transmitted to the crank shaft 2 through the V-ribbed belt 5 thereby restricting the amount of decrease in angular velocity, and at the time of increase in angular velocity, the large total driving torque restricts the amount of increase in angular velocity. In other words, in the comparative example, the rotor performs a function as a flywheel so that the variation in angular velocity of the crank shaft 2 is restricted.

On the other hand, in the example of this invention, at the time of decrease in angular velocity of the crank shaft 2, the transmission of the rotating inertia torque of the rotor to the crank shaft 2 is interrupted so that the crank shaft 2 is largely decreased in angular velocity without receiving the rotating inertia torque, and at the time of increase in angular velocity, the amount of increase in angular velocity is larger in accordance with the lesser amount of total driving torque. In other words, in the example of this invention, the flywheel is lightened by the amount of rotating inertia torque of the rotor which is not transmitted to the crank shaft 2.

Next, FIGS. 13 and 14 are compared with each other. In the comparative example, the tight-side span and the slack-side span are alternately exchanged and the exchanges are frequently made in a period one-half time as long as the period of variation in angular velocity of the crank shaft 2 and the alternator shaft 1a. The amount of variation in tension of the tight-side span is about 110 kgf and the tension of the slack-side span varies within the range of approximate 60 kgf. It is apparent from the above that a substantially large load is applied to the V-ribbed belt 5.

On the other hand, in the example of this invention, no exchange occurs between the tight-side span and the slack-side span. Further, the amount of variation in tension is restricted to approximate 40 kgf for both the spans. As is evident from the above, the load to the V-ribbed belt 5 is substantially reduced as compared with the comparative example.

What is claimed is:

1. A belt transmission device for engine auxiliaries comprising:

an engine having a crank shaft;

an auxiliary machine having a rotor with certain inertia for rotation and an auxiliary machine shaft power-transmittably connected to the rotor;

a transmission belt wound between the crank shaft and the auxiliary machine shaft for transmitting a rotatively driving force of the crank shaft associated with slight variation in angular velocity to the auxiliary machine shaft to drive the rotor of the auxiliary machine into rotation; and a one-way clutch which is provided in a rotation transmission path leading from the crank shaft to the rotor of the auxiliary machine and has a driving member power-transmittably connected to the crank shaft side and a driven member power-transmittably connected to the rotor side, said one-way clutch being switched to a locked state of the driving and driven members at the time of increase of slight variation in angular velocity of the crank shaft to transmit the rotatively driving force of the crank shaft to the rotor, said one-way clutch being switched to a freed state of the driving and driven members at the time of decrease of slight variation in angular velocity of the crank shaft to interrupt transmission of rotating inertia torque from the rotor to the crank shaft, wherein an angle of operational delay of the one-way clutch until the one-way clutch is switched from the freed state to the locked state of the driving and driven members at the time of increase of slight variation in angular velocity of the crank shaft is set to be smaller than a specified angle of displacement of slight variation in angular velocity to be transmitted to the driving member.

2. A belt transmission device for engine auxiliaries according to claim 1, wherein the specified angle of displacement is an angle of displacement of slight variation in angular velocity in a region of high rotational speed of the engine.

3. A belt transmission device for engine auxiliaries according to claim 2, wherein the one-way clutch is placed at a position where the one-way clutch transmits to the auxiliary machine shaft a rotatively driving force transmitted from the crank shaft through the transmission belt, the speed change ratio of the auxiliary machine shaft to the crank shaft is 2, and the angle of operational delay of the one-way clutch is set to a value smaller than 1.6°.

4. A belt transmission device for engine auxiliaries according to claim 1, wherein the auxiliary machine is an alternator.

* * * * *